United States Patent [19]
Mutafelija

[11] 3,936,885
[45] Feb. 3, 1976

[54] TRAINING SIMULATOR AND METHOD FOR NUCLEAR POWER PLANT HEATER AND NON-LINEAR MODELING

[75] Inventor: Boris A. Mutafelija, Allison Park, Pa.

[73] Assignee: Westinghouse Electric Corporation, Pittsburgh, Pa.

[22] Filed: Feb. 23, 1973

[21] Appl. No.: 335,183

[52] U.S. Cl. ........................... 444/1; 176/19; 35/13
[51] Int. Cl. ..... G06f 15/06; G06f 15/56; G09b 9/00
[58] Field of Search ........... 444/1; 235/184; 176/19, 176/24; 35/10, 13, 10.2

[56] References Cited
UNITED STATES PATENTS

| | | | |
|---|---|---|---|
| 3,061,945 | 11/1962 | Hawkins | 35/10 |
| 3,237,318 | 3/1966 | Schager | 35/10 |

OTHER PUBLICATIONS

Reactor Simulator Utilizing a Vacuum System: Harry Reese, Jr.; RCA Technical Notes, RCA TN No.: 493, Sept. 1961.
Dynamic Simulation of a Fast Reactor; R. G. Olson, Nucleonics, May, 1957; pp. 76–79.
An Electronic Reactor Simulator; Ross Cameron & D. A. Austin; Nuclear Power; Apr., 1957; pp. 146–151.
PWR Training Simulator; J. P. Franz & W. H. Alliston; Nucleonics, May, 1957; pp. 80–83.

*Primary Examiner*—Malcolm A. Morrison
*Assistant Examiner*—Edward J. Wise
*Attorney, Agent, or Firm*—H. W. Patterson

[57] ABSTRACT

A method and system of simulating the dynamic real-time operation of a nuclear power plant wherein a plurality of manually operable devices provide input data to a digital computer to calculate physical values corresponding to plant operation to operate indicating devices for monitoring the operation of the plant. It includes the simulation of a feedwater system comprising a number of parallel and series connected feedwater heaters. The simulation of the feedwater heating system is effected by lumping the feedwater heaters into single equivalent heaters for purposes of calculation. Non-linearity of the system is simulated by using a piecewise cubic polynominal or spline fit function of the physical properties of steam and water at saturation. The node-points of the spline curve are obtained by using a second derivative of the physical variable to determine iteratively the optimum node positions.

20 Claims, 10 Drawing Figures

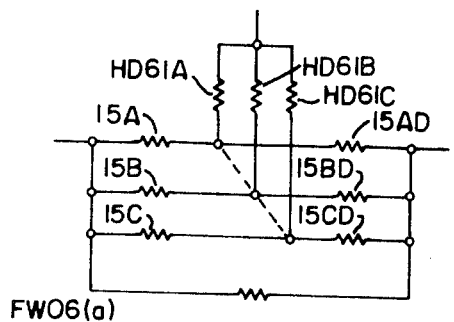
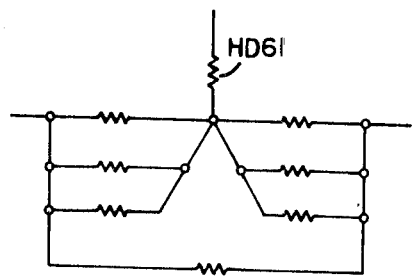
FIG. 105/6
FIG. 105/7

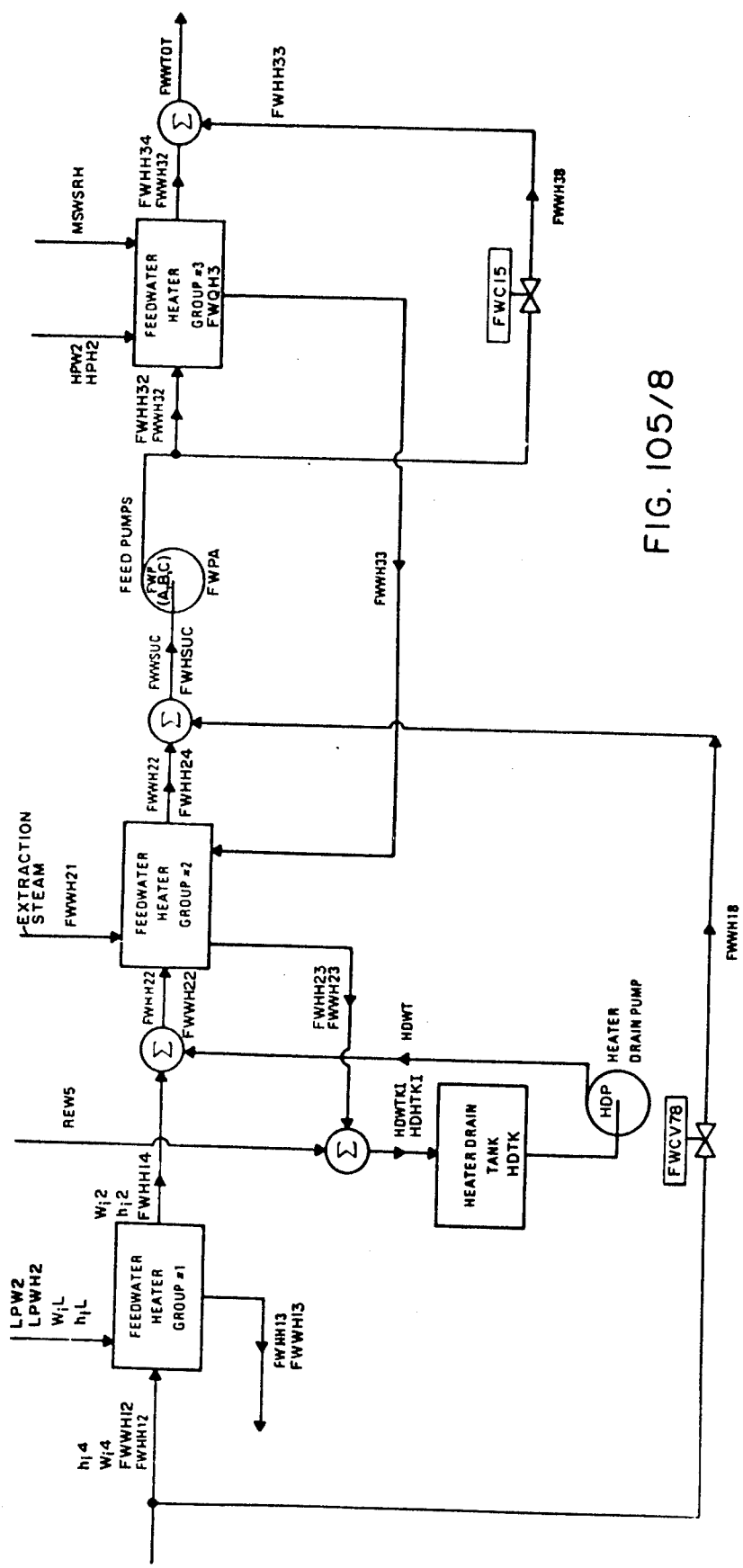
FIG. 105/8

TRAINING SIMULATOR AND METHOD FOR NUCLEAR POWER PLANT HEATER AND NON-LINEAR MODELING

CROSS REFERENCE TO RELATED APPLICATIONS

Reference is made to the following concurrently filed and related patent applications which are assigned to the present assignee:

1. Ser. No. 333,901 entitled "Training Simulator For A Nuclear Power Plant" and filed by G. L. Gregg, R. E. Putman and J. W. Gomola filed Feb. 23, 1973 in the U.S. Patent Office.
2. Ser. No. 335,286 entitled "Nuclear Power Plant Training Simulator System And Method" and filed by R. W. Ferguson and R. E. Converse filed Feb. 23, 1973 in the U.S. Patent Office.
3. Ser. No. 335,295 entitled "Nuclear Power Plant Training Simulator Modeling Organization And Method" and filed by W. H. Alliston filed Feb. 23, 1973 in the U.S. Patent Office.
4. Ser. No. 335,181 entitled "Training Simulator For Nuclear Power Plant Reactor Monitoring" and filed by W. H. Alliston, F. R. Czerniejewski and B. A. Mutafelija filed Feb. 23, 1973 in the U.S. Patent Office.
5. Ser. No. 335,288 entitled "Training Simulator For Nuclear Power Plant Reactor Control Model And Method" and filed by F. R. Czerniejewski filed Feb. 23, 1973 in the U.S. Patent Office.
6. Ser. No. 335,294 entitled "Training Simulator For Nuclear Power Plant Reactor Coolant System And Method" and filed by W. H. Alliston and A. A. Desalu filed Feb. 23, 1973 in the U.S. Patent Office.
7. Ser. No. 335,285 entitled "Engineered Safeguards Systems And Method In Nuclear Power Plant Training Simulator" and filed by A. A. Desalu filed Feb. 23, 1973 in the U.S. Patent Office.
8. Ser. No. 335,391 entitled "Fluid Distribution Network And Steam Generators And Method For Nuclear Power Plant Training Simulator" and filed by W. H. Alliston, S. J. Johnson and B. A. Mutafelija filed Feb. 23, 1973 in the U.S. Patent Office.
9. Ser. No. 335,293 entitled "Secondary System Modeling And Method For a Nuclear Power Plant Training Simulator" and filed by S. J. Johnson filed Feb. 23, 1973 in the U.S. Patent Office.

BACKGROUND OF THE INVENTION

The present invention relates to the real-time full scope simulation of the dynamic operation of a nuclear powered electrical generating plant for training plant operators.

The increasing demand for well-trained power plant operators together with the complexity of modern day power plants has led to the realization that the simulator is the most effective tool for such training.

Also, with advancements in nuclear power plant technology, experienced operators from time-to-time need retraining in order to be competent. An actual nuclear plant cannot provide the operator with the required experience, such as starting up, changing load, and shutting down, for example, except after years of experience; and even then, it is unlikely that he would observe the effect of important malfunctions and be able to take the best corrective procedures.

Although simulators have been used for many years, in power plant design, it is only recently that they have been used for power plant operator training.

An article in the July 22, 1968 issue of "Electrical World" entitled "Nuclear Training Center Using Digital Simulation" briefly describes the installation of a boiling water reactor plant simulator. An article in the same publication in the Oct. 6, 1969 issue entitled "Huge Simulator to Ready More Reactor Operators" discusses the proposed installation of a pressurized water reactor simulator. In Volume 10, No. 5 of the publication "Nuclear Safety" published during September and October, 1969 is an article entitled "Training Nuclear Power Plant Operators With Computerized Simulators"; and in the June, 1972 issue of the publication "Power Engineering" there is an article entitled "Simulators" which describes a number of power plant operator training simulators presently in use or proposed.

Design simulators usually cover only a small part of the process, and may run slower or faster than real-time; while training simulators must operate and respond in a manner identical to the actual plant. A design simulator may involve only a narrow range of conditions, while a training simulator must simulate from "cold" shutdown to well beyond normal operating conditions. A design simulator usually involves only the major process, while a training simulator should cover every auxiliary system with which the plant is concerned.

Training simulators presently in use for operator training, which are more or less complete in their simulation, utilize a digital computer connected to control consoles that are identical in operation and in appearance to the plant being simulated. Also, an instructor's console is connected to control the simulator, introduce malfunctions, initialize the selected plant at selected states of operation and perform other functions useful for training purposes. These computers have been of the same type used for aircraft training in some instances, and process control in others.

A full scope simulation of a nuclear power plant for operator training is of such extensive scope that it is advantageous to provide as many modeling simplifications as possible within the limits of steady state and transient accuracy. The mathematical modeling of a nuclear power plant is concerned with the materials, energy and volume balances, which often result in mathematical variables such as temperature, pressure, material flows and flow rates, concentration of materials, specific volumes and enthalpies, mechanical speeds, vibrations, electrical current, voltage and frequency, etc. A conference paper published by the Institute of Electrical and Electronic Engineers entitled "Mathematical Modeling for Power Plant Operator Simulators" written by B. H. Mutafelija et al, discusses many of the problems and desirable features connected with the mathematical modeling of power plant simulators.

The simulation of the power plant must be of sufficient detail and accuracy that the operator cannot distinguish between the behavior of the simulator and that of the actual plant under conditions of cold startup, hot restart, normal load changes, and numerous malfunctions causing a load cut-back or a complete shut-down.

In order to attain the accuracy required over a complete range of operation of a system that is non-linear, such as where it includes a plurality of heat exchangers in a feedwater system, and at the same time provide as many modeling simplifications as possible, it is desirable to calculate physical properties which provide for the greatest amount of accuracy, and simplification in calculation, and at the same time to utilize a curve fit that is accurate for the entire range of operation. Where there are a number of heat exchangers, such as feedwater heaters, in a feedwater system for example, it is desirable that for purposes of simulation they be lumped into as few equivalent feedwater heaters as possible.

For the single equivalent heaters, it is then desirable to use a dynamic energy balance equation for calculating a value dependent upon the dynamic behavior of outlet enthalpy. A value for condensed steam enthalpy can then be calculated with a curve fit of the outlet enthalpy, and finally a value for pressure can be effectively calculated using a curve fit function of condensed enthalpy.

In the dynamic simulation of the physical properties of steam and water in such a system, for example, where the numerical values of such properties are used in other simulations or continuously displayed or recorded through their entire operating range, such as the calculation of pressure in the feedwater heaters using a curve fit function of condensed enthalpy, it is necessary that such values be accurate and that the meters and recorders act in an identical manner to the system being simulated. To effect such a result, for physical values that are non-linear, that is, where the value of one physical property does not increase or decrease proportionately with the increase or decrease of another physical property, it is desirable to segment such values so that relatively simple calculations can be made with a minimum of error for each segment and provide continuity between segments. It is also desirable to effect such results with a minimum number of segments in order to minimize the complexity of the calculations and the amount of information required to be stored in the computer performing such calculations.

A spline fit function for the properties of steam and water at saturation, an extreme degree of accuracy is exhibited, provided that the number and location of the node points on the entire actual physical curve are such that the calculated spline curve equals or closely approximates the actual physical curve throughout its entire range. Thus, in finding the location and number of node points or intersections between segments, it is desirable that the minimum number of nodes be selected for a given allowable error. For such a given number of nodes, the actual position on the curves must be accurately determined so that the pointwise maximum error is minimal. In the past, several attempts have been made to optimize the node positions in cubic spline approximations. Various approaches have been used ranging from pure experimental node insertion on the curve, to algorithms based on the least square or on Chebyshev norms. The problem of finding optimum position of nodes for a given allowable maximum error leads to an excessive number of nodes if there is no prior knowledge about the curve to be approximated. Thus, in finding the best or optimum position of the nodes when their number is fixed, there have been several approaches. One approach is the minimization of a distance function; but the equations of such an approach have a very non-linear form, and are difficult to handle in a computer. Another approach is a search technique which will of course give the optimum node position after a long period of time, but at the same time may not be a completely convergent procedure.

In contrast, it is desirable to obtain optimum node position for a cubic spline curve fit by using the second derivative of the cubic spline which is a piecewise linear function. This permits a procedure that optimizes the area under a piecewise linear curve by solving a set of first order non-linear differential equations. The determined node positions are used to be the optimal positions of the nodes of the cubic spline itself. This method provides simplicity and rapid convergence for a wide variety of physical curves that possess a certain degree of smoothness, such as steam and water properties, for example.

SUMMARY OF THE INVENTION

According to the broad principles of the present invention, a method and system for simulating the real-time dynamic operation of a steam power plant for training purposes wherein a plurality of manually operable devices provide input data to a digital computer that calculates physical values of fluids in a simulated non-linear system that includes a plurality of interconnected heat exchangers for increasing the temperature of the fluid to provide output data for other simulated calculations of the system and for operating indicating devices to monitor the operation of the plant, simulates the plurality of feedwater heaters by mathematically lumping them into a single equivalent feedwater heater.

In a more specific aspect, a feedwater heating system is simulated by the digital computer to calculate data values depending on dynamic behavior of feedwater heater outlet enthalpy in accordance with a dynamic energy balance equation. A data value depending on condensed steam enthalpy is calculated in accordance with the outlet enthalpy data value, and a data value depending on pressure is calculated in accordance with the outlet enthalpy data. In a still more specific aspect, the pressure data is calculated utilizing a cubic spline curve fit function of condensing enthalpy.

In another aspect, the node points of the cubic spline function are obtained in accordance with a second derivative of the physical variables used in the simulation.

BRIEF DESCRIPTION OF THE DRAWINGS

FIG. 105/6 is an analogous electrical network for simulating the connection of feedwater heater strings to individual pumps;

FIG. 105/7 is an analogous electrical network illustrating the use of one equivalent pump in the simulation;

FIG. 105/8 is a schematic block diagram of the simulation of the feedwater heater train;

GENERAL DESCRIPTION OF SIMULATED NUCLEAR POWER PLANT

Figure 1:
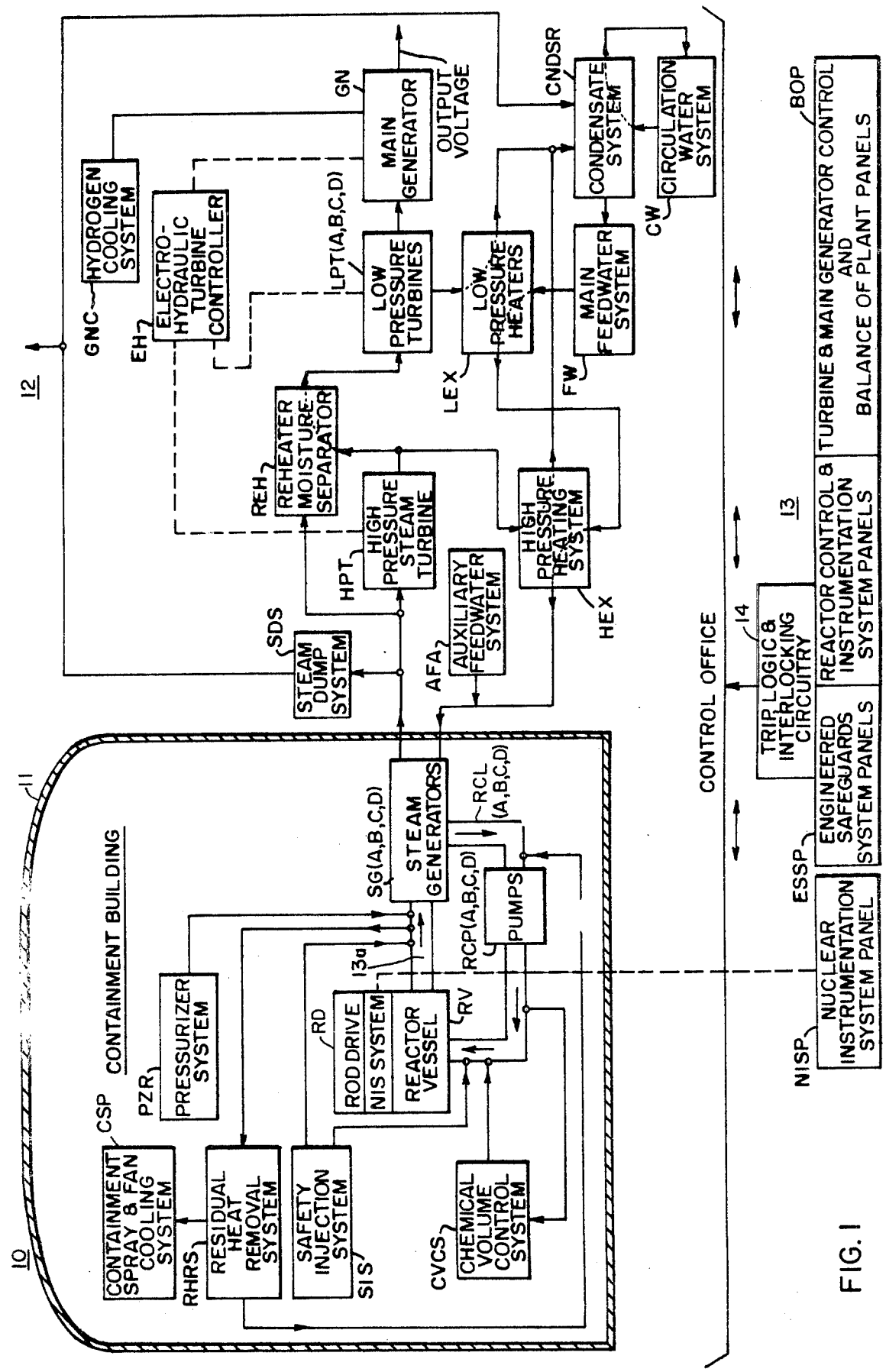
FIG. 1 shows a schematic block diagram of a nuclear powered electrical generating plant that is simulated in accordance with the present invention.

Referring to FIG. 1, the preferred embodiment of the invention is described in connection with the simulation of a nuclear power plant, in this case a four loop pressurized water reactor power plant. Such a plant includes a primary system generally referred to as 10 which is housed in a containment building 11, a secondary system, generally referred to as 12, and a control office that includes control and indication panels 13 for operating and monitoring the various elements in the power station. The plant itself is described herein in a general sense to an extent which will aid in understanding the invention. More detail on the plant is ascertainable from the more detailed invention description herein. Extensive background information on nuclear plants of various kinds is widely available in prior patents and publications. Certain invention features are applicable to nuclear plant types other than the pressurized water type.

The primary system includes a nuclear reactor housed in a reactor vessel RV and in this instance four closed reactor coolant loops RCL (A, B, C, and D), connected in parallel to reactor vessel RV. Each loop contains a reactor coolant pump RCP (A, B, C, and D) and a steam generator SG (A, B, C, and D). The reactor vessel RV, reactor coolant loop piping RCL, pumps RCP, and primary side of steam generators SG, all form what is referred to as a reactor coolant system RCS. The primary system 10 also includes an electrically heated pressurizer system PZR and certain auxiliary systems hereinafter described.

High pressure water circulates through the reactor vessel RV to remove the heat generated by a nuclear chain reaction within a fuel arrangement disposed in the reactor. This heated water exits from the reactor vessel RV and passes via the coolant loop piping RCL to the steam generators SG. In the steam generators SG, the coolant water gives up its heat to the feedwater in the secondary side of the steam generator SG to generate steam for a turbine driven electrical generator GN. The reactor coolant cycle is completed when the coolant is pumped back to the reactor vessel RV for reheating in the nuclear reactor.

Rod drive system RD is used to control reactor power level and consists of clusters or banks of movable cylindrical neutron absorber rods. The absorber rods move within guide tubes in certain fuel assemblies in the reactor fuel arrangement. The reactor coolant pumps RCP are vertical single stage mix flow pumps of the shaft seal type; and are designed so that adequate coolant flow is maintained to cool the reactor core adequately under all conceivable circumstances. The steam generators SG are vertical U-tube units that contain integrally therewith, in the secondary side, moisture separation equipment that reduces the moisture content of the steam to one-quarter percent or less. The electrically heated pressurizer PZR connected to one of the four reactor coolant loops RCL maintains the reactor coolant system RCS pressure during normal operation, limits the system coolant pressure variation during plant load transients, and keeps the system coolant pressure within design limits during abnormal conditions.

The reactor operating level is controlled inherently by a negative temperature coefficient of reactivity of the water; by control rod cluster positioning as already indicated; and by a soluble neutron absorber, such as boron in the form of boric acid. The boric acid is inserted into the coolant during cold shutdown, partially removed during startup, and adjusted in concentration during the life time of the fuel in the core to compensate for such effects as fuel consumption, and accumulation of fission products, which tend to slow the nuclear chain reaction.

The primary system includes engineered safeguard systems, ESS including chemical and volume control system CVCS, safety injection system SIS, residual heat removal system RHRS, containment spray and fan cooling system CSP, and an accumulator discharge system (not shown) which is described in detail in connection with the description of the individual models.

The chemical and volume control system CVCS performs a number of functions, such as filling the reactor coolant system RCS, providing a source of high pressure water for pressurizing the system RCS when cold, maintaining the water level in the pressurizer system PZR when the RCS system is hot, reducing the concentration of corrosion and fission products in the reactor coolant, adjusting the boric acid concentration of the reactor coolant, and providing high pressure seal water for the seals of the reactor coolant pumps RCP.

The residual heat removal system RHRS portion of the engineered safeguard systems ESS transfers heat energy from the reactor core and the system RCS during plant shut-down and refueling operations. Components in the residual heat removal system RHRS are also employed in conjunction with the safety injection system SIS.

The safety injection system SIS supplies borated water to the system RCS to limit the fuel rod cladding temperature in the unlikely event of a loss of coolant accident. Also, the system SIS functions to provide a means of introducing a spray of borated water into the containment 11 as an additional dynamic heat sink. The system SIS includes several independent subsystems characterized by equipment and flow path redundancy. This redundancy assures complete reliability of operation, and continued core cooling even in the event of a failure of any single component to respond actively as intended. For example, during the passive accumulator injection phase of the system operation which is described in connection with the individual models, accumulator tanks rapidly inject borated water into the reactor coolant system automatically when the depressurization of loops RCL causes a reversal of the pressure drop across the accumulator check valves. The accumulators provide rapid cooling of the reactor core for large breaks which would otherwise result in core uncovering and overheating before the electrically driven low head safety pumps of the SIS system are energized and delivering coolant. The low head system of safety injection provides for injection of borated water into the RCL loops for large breaks, which would result in rapid blowdown and depressurization. A high head system for injection into the loops RCL for small breaks is provided for those instances that would result in slow blowdown and depressurization. The low head system utilizes pumps of the residual heat removal system RHRS which takes water from a refueling water storage tank, and pumps borated water through one of the residual heat exchangers, through an injection header and injection lines to each of the reactor coolant loops. The high head safety injection phase utilizes two subsystems which provide extremely rapid response to an SIS system actuation signal, utilizing a boron injection tank and a charging pump of the chemical and volume control system CVCS.

The containment building 11 completely encloses the entire primary system and insures that an acceptable upper limit for leakage of radioactive materials to the environment is not exceeded, even if gross failure of the elements contained therein were to occur. The containment spray system CSP is included in the primary system to limit the pressure in the containment atmosphere to below the containment design pressure, and remove sufficient iodine from the containment atmosphere to limit the radiation doses to safe value. This system delivers NaOH to the space within the containment building 11. The reactor containment fan cooling system portion of CSP which is also part of the containment building monitoring system removes heat from the containment building during normal operation, and during any loss of coolant accident. When a loss of coolant accident is sensed, the fan motors are automatically switched to low speed to provide circulation of the steam-air mixture in the containment building.

The steam generators SG (A, B, C, and D) deliver steam at appropriate pressure and temperature in the secondary system for conversion to mechanical and then to electrical energy in the turbines and the generators, respectively. The secondary steam is additionally used for various operational auxiliary services such as turbine shaft steam seals, turbine drives for main and auxiliary feedwater pumps and steam jet air ejectors.

Steam is admitted to a double flow high pressure turbine HPT that is controlled by governor valves with quick acting throttle or stop values ahead of them for rapid isolation in an emergency. Four separate pipes convey steam from the governor valves to the turbine nozzle chambers. The steam passes through an impulse blading or control stage and a number of reaction stages of the high pressure turbine HPT; the impulse chamber steam pressur is measured and used as a load measurement for use in reactor control.

On leaving the last row of high pressure blades, the steam has a moisture content of approximately 10%. Thus, the steam is then passed through a moisture separator and reheater REH to improve the turbine efficiency and reduce the low pressure turbine exhaust moisture. The exhaust steam from the high pressure turbine when first passed through the moisture separator portion REH removes approximately 10% of the flow which is extracted as moisture. The remaining 90% flows through steam heated reheater portion of REH where it receives approximately 100°F superheat. The moisture is removed and drained to a heater drain tank (not shown); and the steam which rises above the moisture separator passes over the reheater and is reheated by live steam.

The hot reheated steam is conveyed to the double flow low pressure turbines LPT (A, B, C) the number of which in use can depend on the electrical output required. The low pressure turbine exhaust directs the steam to a condenser CNDSR that has cooling water passing through tubes which condense the steam to water where it is collected in a chamber, called a hot well. The condenser cooling water is controlled by circulating water system CW. The condensate system CNDSR and the feedwater system FW return the condensed steam from the turbine condenser, and the drains of the regenerative feed heating cycle, to the steam generators SG (A, B, C, and D) while maintaining the proper water inventories throughout the cycle.

The feedwater system FW conveys the feedwater through low pressure heaters LEX and then through high pressure heaters HEX to the generators SG. The auxiliary feedwater system AFA is used when the main system is inoperative. These systems automatically maintain the water level of the steam generators SG during both steady-state and transient operation.

The turbine HPT is equipped with an electrohydraulic control system EH comprising a solid state electronic controller and a high pressure fluid supply. The electronic controller computes a control signal based on measured turbine speed, measured first stage steam pressure, and speed and loss reference values established by the dispatcher or initiated at the operator's control panel 13. The control signal is transmitted to the electrohydraulic actuator of each main steam throttle and/or governoring valve to produce the valve positioning needed to meet the reference load. During turbine startup, the throttle valves are position controlled to accelerate the turbine from turning gear or higher speed up to synchronous speed. The high pressure hydraulic fluid system provides the power for all turbine steam control valves, electrohydraulic actuators, and positions the governor valves in response to the electric control signals from the electronic controller. The interceptor valves are also operated by the hydraulic fluid, and they may be position controlled or simply controlled to be either open or closed.

The electrohydraulic control system provides turbine control during all phases of operation by varying the turbine valve openings. Hydraulic cylinders move the valves to the required opening with electrically operated servo-valves controlling the cylinder's position.

The main generator GN operated by the turbine is a hydrogen inner cooled synchronous generator with a water cooled stator and an output voltage of approximately 22 to 25 kV at 60 cycles. The excitation is provided by a shaft driven air cooled brushless exciter. Cooling for the generator is provided by system GNC which circulates hydrogen at a pressure of about 75 psig through the generator GN by fans attached to the generator shaft.

Various plant parameters including reactor parameters, coolant and steam pressures, temperature, and flows and liquid levels in the various systems, as well as the speed of the turbines and electrical output of the generator are sensed and displayed through meters, alarms, and annunciators on the central office panel 13. Among the reactor parameters the position of the rods of the reactor and the state of all operable components are displayed to inform the operator of the condition or state of operation of the nuclear power plant.

The state of operation of the various components of the plant and certain fluid pressures, temperatures, and levels are connected through interlocking and logic circuitry 14 to prevent unsafe operation of selected system components and to trip or shut down the plant under abnormal conditions.

Nuclear instrumentation panel NISP is provided with various recorders, indicators, meters, and selector switches to display the neutron flux values in various sectors of the reactor, both in an axial and radial direction, which function is termed in-core flux mapping.

Also, a portion of the panel NISP displays through meters the flux in various sectors of the reactor vessel RV to inform the operator of the various ranges of nuclear flux, such as source, range, intermediate range, and power range of the reactor during start-up and shutdown, which operation is termed ex-core radiation detection. Further, the temperature of individual fuel rods of the reactor, and the radiation in various parts of the plant are monitored and displayed on the panels NISP. Finally, the auxiliary power to the plant is controlled by a portion of the panel NISP.

GENERAL DESCRIPTION OF SIMULATOR CONFIGURATION

The nuclear power plant simulator according to one embodiment of the invention comprise digital computation apparatus and peripheral equipment operatively connected to control and indication panels which are identical in appearance and wiring to the actual control and indication panels of the four loop pressurized water reactor power plant that is simulated. The general function, structure, and operation of digital computers is set forth in a publication entitled "Electronic Digital Systems" by Mr. R. K. Richards, which was published in 1966 by John Wiley and Sons, Inc. and bears the Library of Congress card catalog number 66-17618, to which reference is made for a detailed description thereof in order to aid in an understanding of the apparatus and methods in carrying out the invention.

Figure 2:
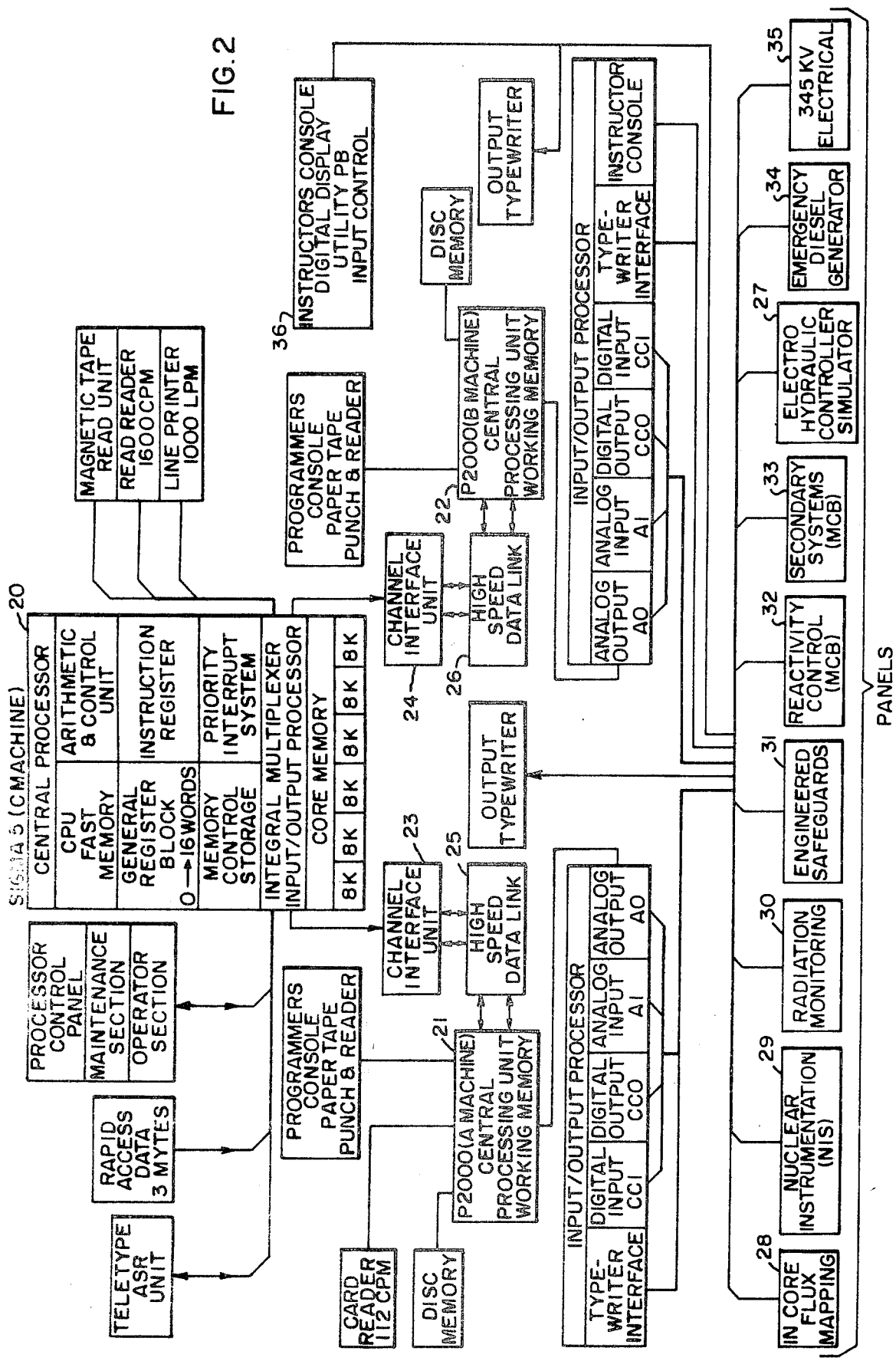
FIG. 2 shows a schematic block diagram of the apparatus used in simulating the operation of the plant shown in FIG. 1.

Specifically, and referring to FIG. 2, the simulation system includes a Sigma 5 digital computer 20 referred to at times in this specification also as the C machine and associated peripheral equipment. The Sigma 5 computer system is manufactured and sold by Xerox Data Systems, Inc. and has been in general use for over one year prior to the filing date of this application. For more information on the Sigma 5 computer system reference is made to the appendix.

The simulator also includes digital computers 21 and 22 referred to at times hereinafter also as the A machine and B machine, respectively and associated peripheral equipment of the type manufactured and sold by Westinghouse Electric Corporation, and which is known as model P2000, and which computers have been in general use for over one year prior to the filing date of this application. The P2000 digital computers 21 and 22 are described in a publication entitled "Prodac 2000 Computer Systems Reference Manual" copyrighted in 1970 by Westinghouse Electric Corporation and bears copyright Registration No. A244775, to which reference is made to aid in an understanding thereof.

The Sigma 5 computer, or C machine provides an extensive arithmetic capability for the power plant simulator. The computers 21 and 22, act as process input/output controllers for the C machine. In practicing many features of the invention, a single computer or other multiple computer arrangements may be employed.

Communication between the A, B, and C machines is provided by a combination of the Xerox Data Systems Model 7650 channel interface units 23 and 24, and high speed data link devices 25 and 26 respectively, described more fully hereinafter. The C machine provides the software control and synchronization for the multiple computer configuration involving the A machine, B machine, and C machine; and the A and B machines in addition to providing the process input/output capability for the C machine also provide a capability for instantaneous simulator responses through their external interrupt system, the processing of all interlock and protection system logic, and the processing of several employed in the simulator models, such as a reactor control rods program. The significant hardware features associated with each of the A and B machines as shown in FIG. 2 included in the appendix. The major C machine hardware subsystems illustrated in FIG. 2 and utilized in the present embodiment of the invention are also included in the appendix to this specification.

The simulation of the electrohydraulic control system EH as depicted in FIG. 1 and represented by a simulator panel portion 27 of FIG. 2 is accomplished in part by the actual analog electrohydraulic controller manufactured and sold by Westinghouse Electric Corporation, which has been in use for more than a year prior to the filing date of this application. The panels 27 through 35 in FIG. 2 provide the same outward appearance and operation as panels in an actual plant and are connected directly through appropriate computer system equipment to the A machine and the B machine.

Instructor's console 36, which provides the control facility to start, stop and manipulate the simulator is connected to software in the B machine.

A basic real time batch monitor (hereinafter referred to as RMB) software system of the C machine is a two partition system designed for normally running simultaneously foreground and background programs. The foreground programs include the system software extension programs which are made up of a sublevel processor, data link handler, and disc handler. Such foreground programs also include data conversion routines, and various dynamic models for the simulated system, which include reactor models, primary system models, secondary system models, a valve handler routine, a pump handler routine, and a controller handler routine. In order to permit an economy in core memory requirements, in the present embodiment of the invention the foreground programs and the background programs are not run at the same time.

CONTROL PANELS

In controlling an actual nuclear power plant of the type being simulated, the individual control devices such as selector switches, levers, and pushbuttons close contacts to select certain components for operation, to energize motor operated valves, solenoids, and relays; and through a protective system of logic to select, or change the position or condition of various components for starting up, varying operation, shutting down, providing emergency measures in the event of malfunction, and testing components in subsystems of the plant. In addition, certain plant components or subsystems function in automatic control loops to which there are typically applied one or more monitored plant variables as feedback signals.

In monitoring the operation of an actual plant, temperature, pressure, flow, level, flux, and other physical measurements are detected by appropriate sensing devices which transmit such information to the control panels for operating meters, recorders, and indicators. As already indicated certain monitored variables are also used for control.

In realistically and accurately simulating the control and monitoring of a nuclear power plant in accordance with the present embodiment of the invention, such control panels together with the control and monitoring devices are an exact replica physically and operatively, of the plant being simulated. However, in simulating the system in accordance with the present embodiment, the control and monitoring devices of the control panels are wired to each other, and to turbine EH controller; and also to contact input and contact output terminals, respectively, on the A or B machines. The panel interface logic and the plant protective logic are contained in both the A and B machines as hereinbefore mentioned. The control consoles permit the student operator to control and monitor the operation of the plant in the same manner as the operator of an actual plant. For example, he can start up, increase the power, shut the plant down, and restart. At any time the instructor can change physical values or malfunction the models as previously described. Then the operator can change the operation of the plant to correct the malfunction or introduce emergency measures as required. The student is able to see realistically in real-time the consequences of any action that could be taken in the real plant.

In detailed drawings of the control panels, descriptive legends are associated with appropriate control and monitoring devices in a manner similar to an actual installation; and in addition thereto, software symbols in many instances are used to identify specific control panel devices with the same software symbol being used to identify the component being operated by such devices in the schematic diagrams of the actual system being simulated. In other instances, the actual valve number is used to the schematic diagram and the control panel where it will aid in understanding the simulation of the system.

FEEDWATER HEATER THERMODYNAMICS (RHMSEP)

Figure 93:
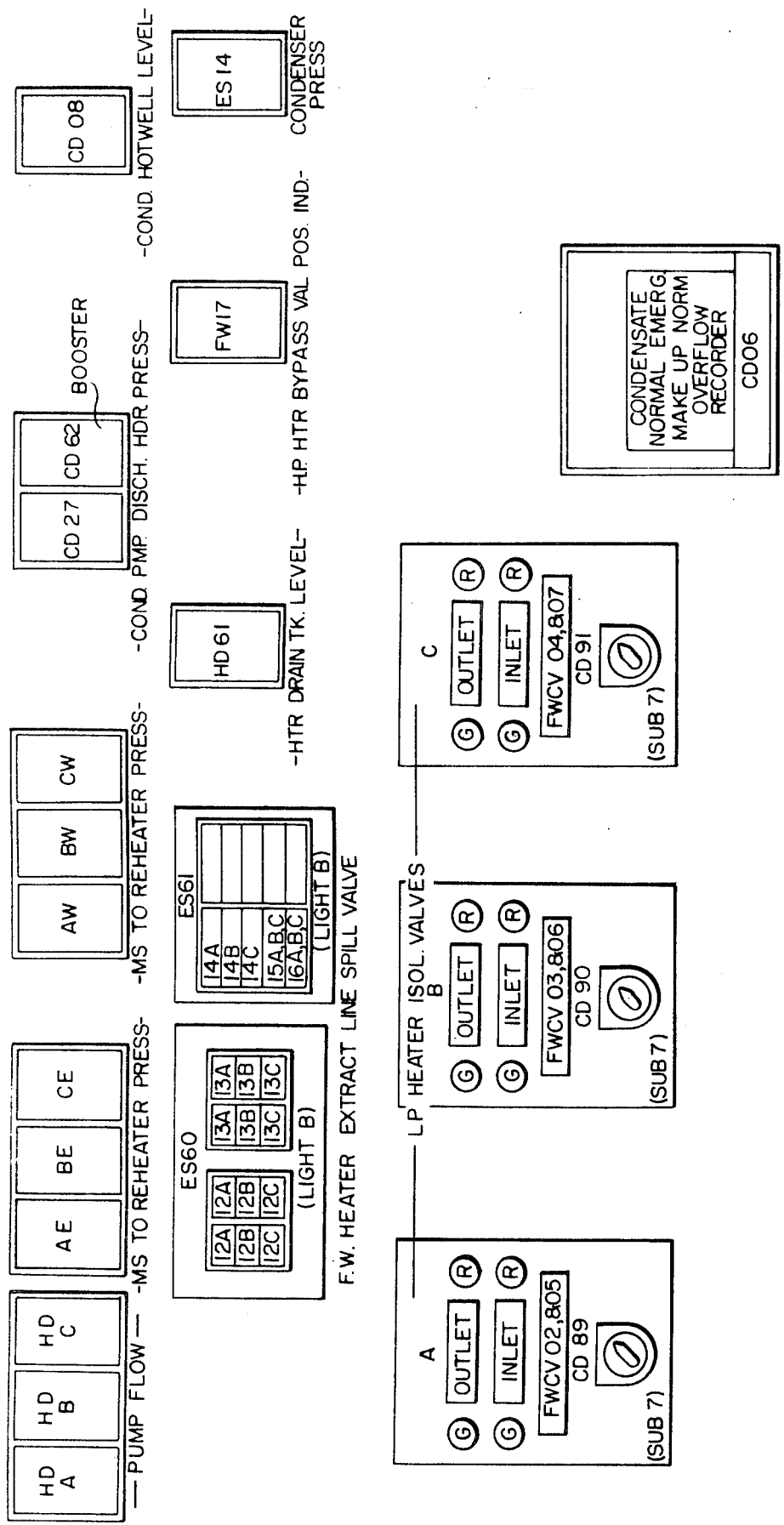
FIGS. 93I, 93J and 93M illustrate a front view of a portion of the control panels that conclude the feedwater heaters.
Figure 93J:
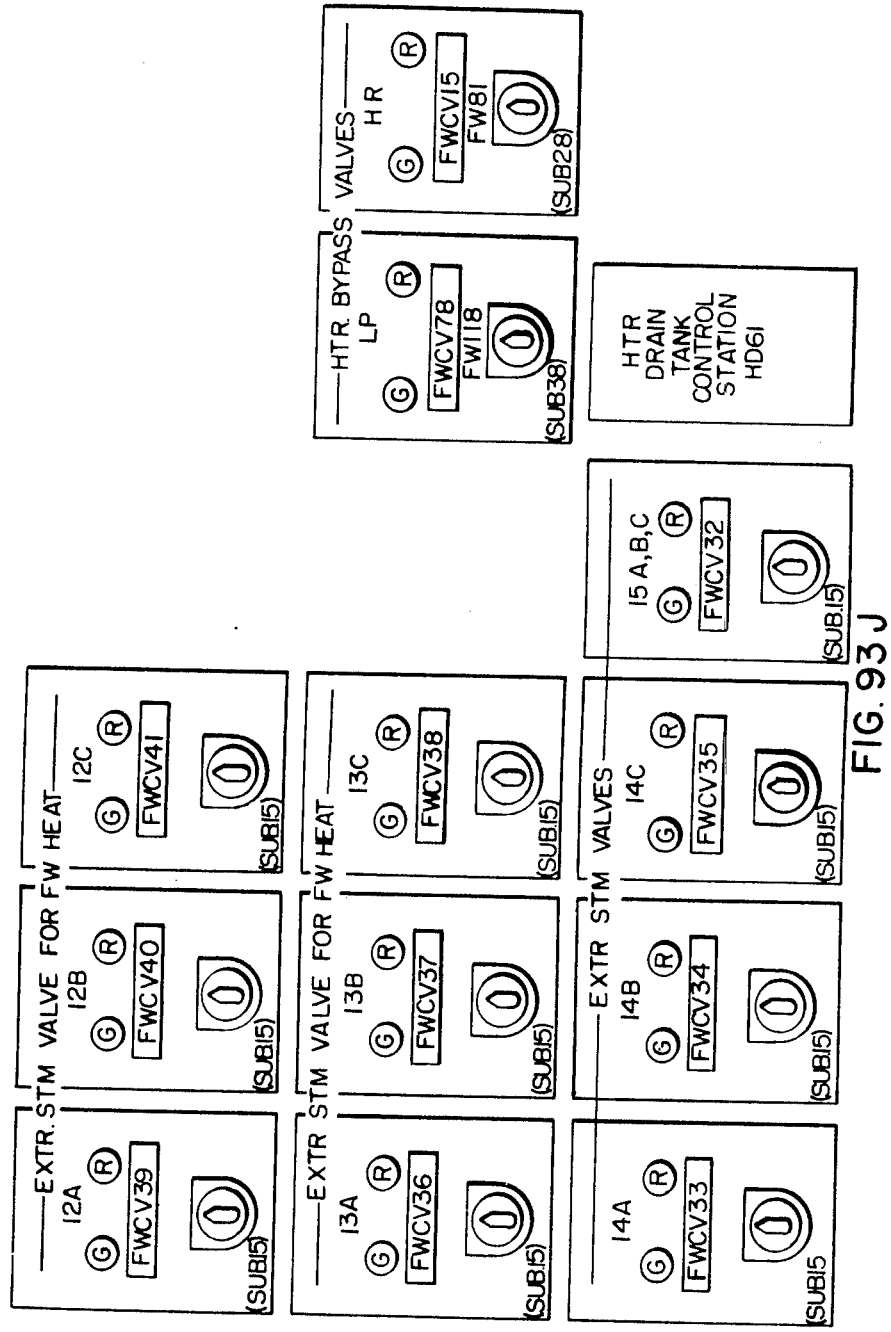
Figure 93M:
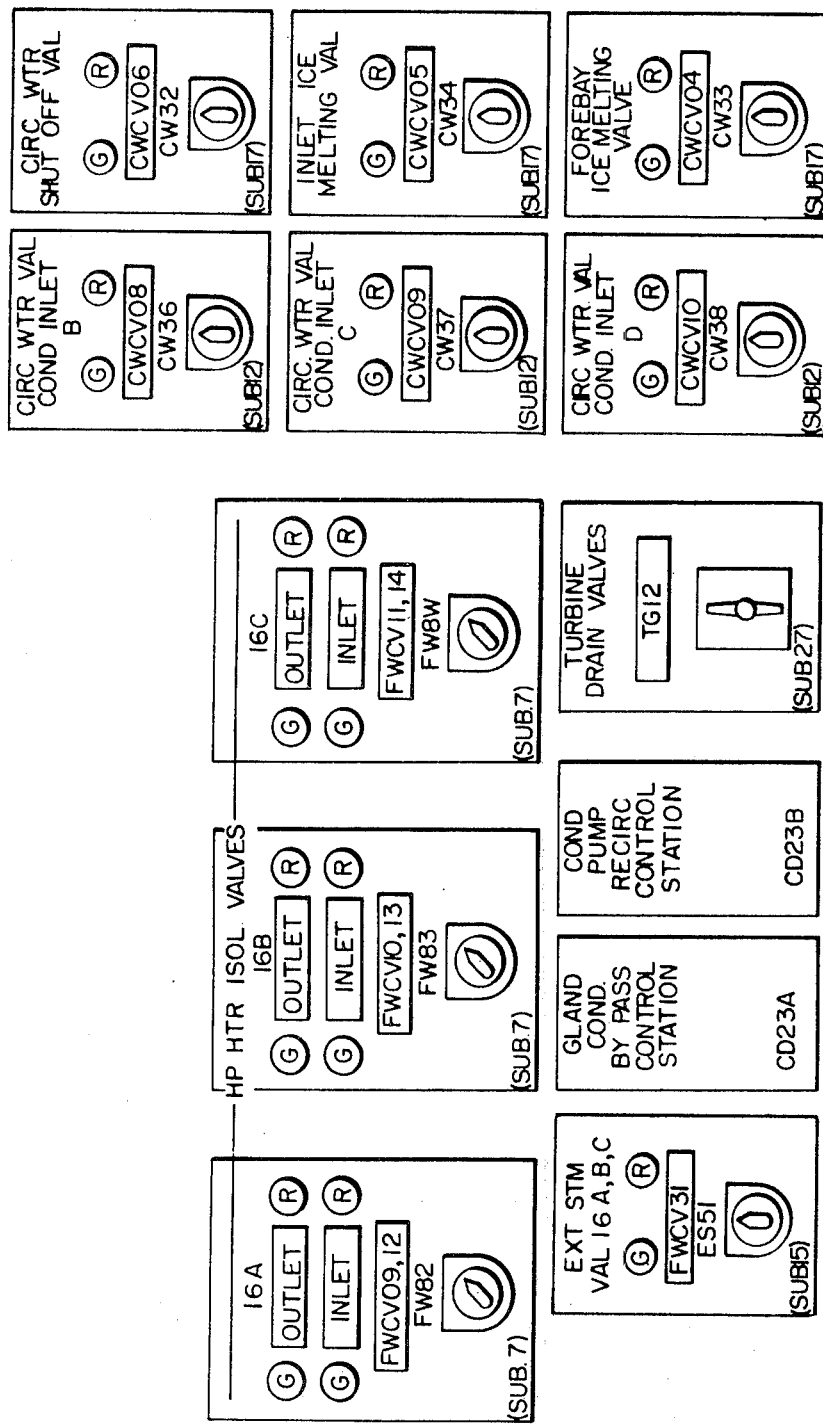
Figure 105A:
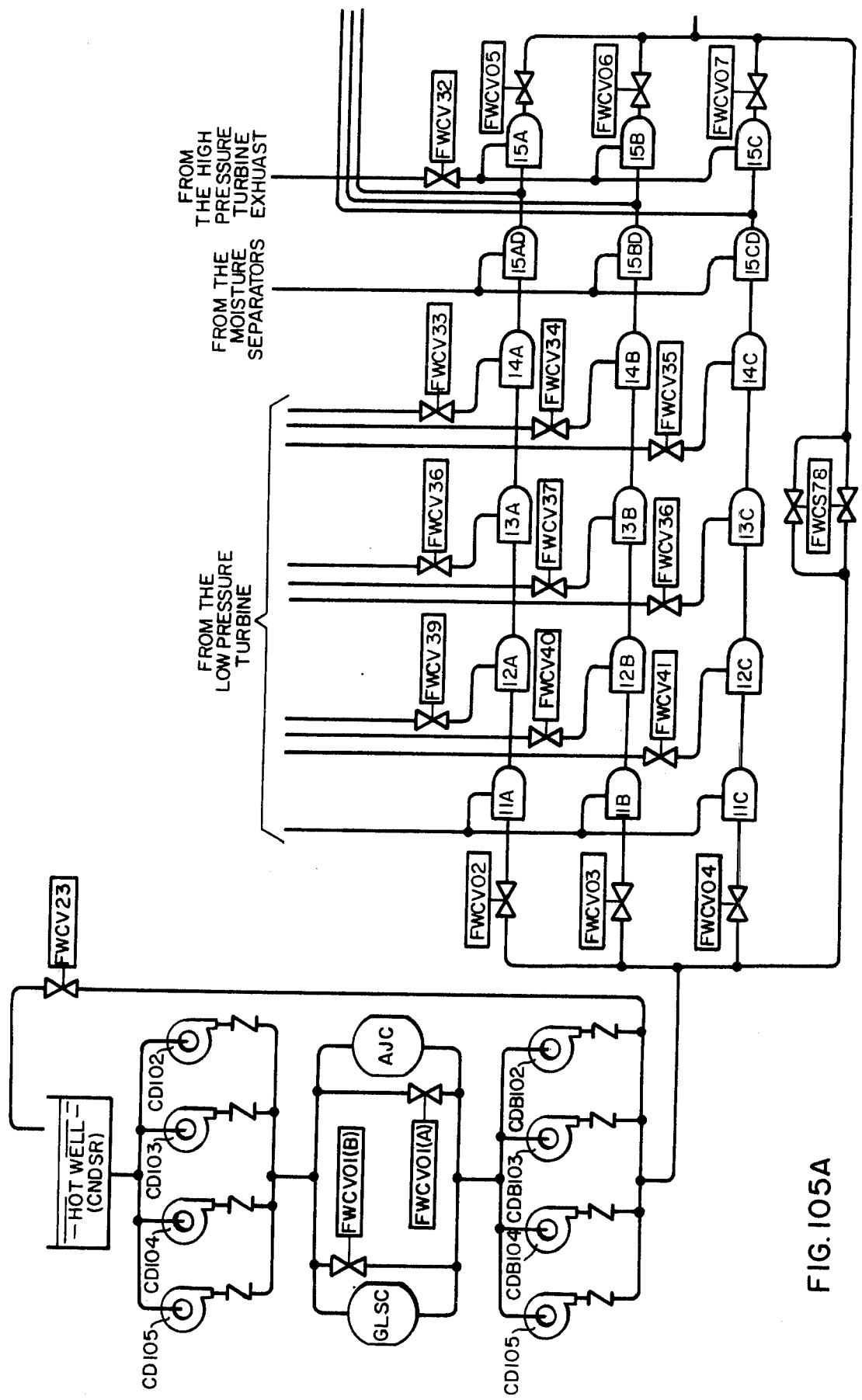
FIGS. 105A and 105B when placed end-to-end illustrate schematically the feedwater system of the type being simulated.
Figure 105B:
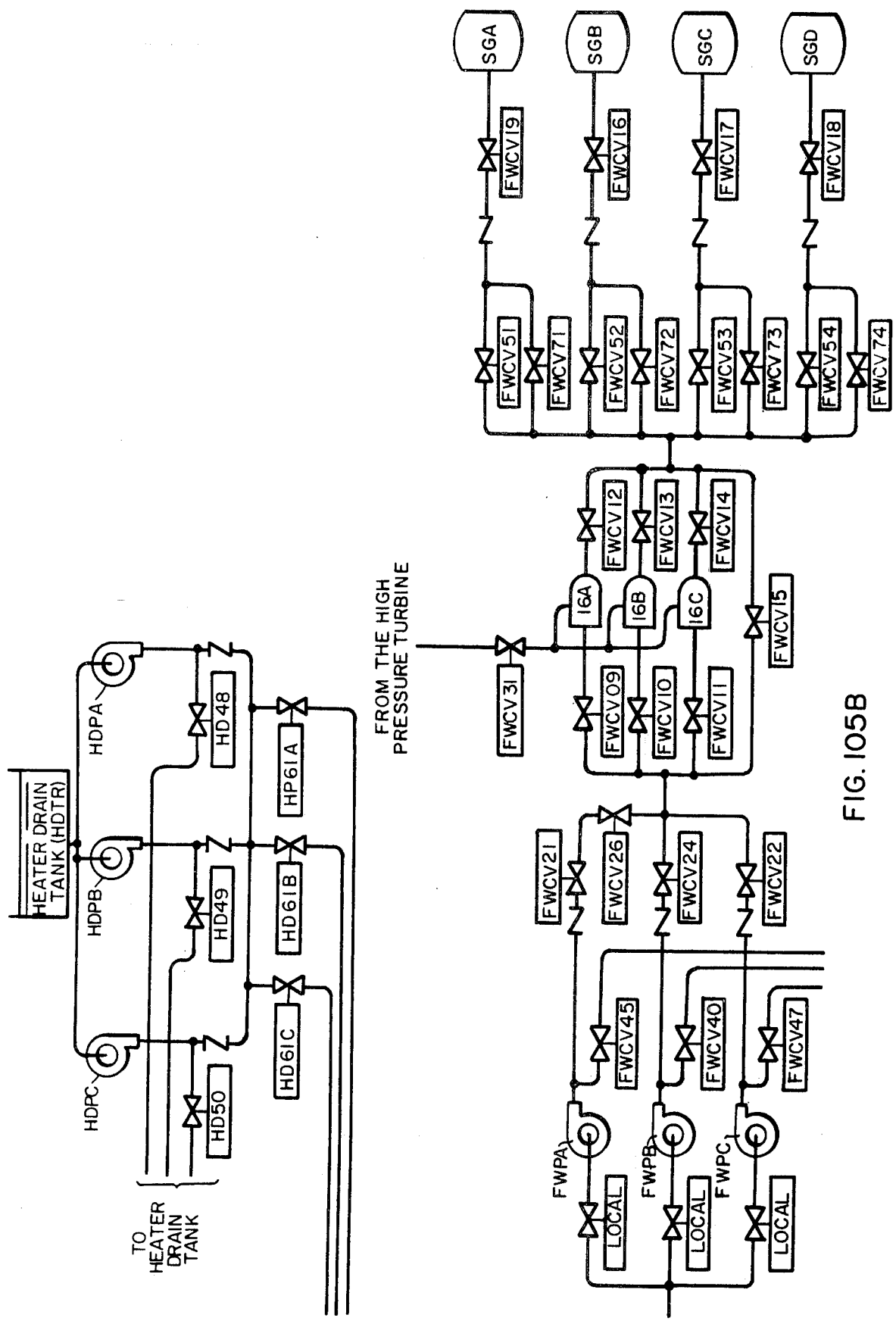

Referring to FIGS. 105A and 105B, there are three parallel strings of low pressure feedwater heaters, with each string including four separate feedwater heaters. The first string includes feedwater heaters 11A, 12A, 13A, and 14A. The second string includes heaters 11B, 12B, 13B, and 14B; and the third string of feedwater heaters includes 11C, 12C, 13C, and 14C. In each string of feedwater heaters, there is a drain cooler 15AD, 15BD, and 15CD, respectively. The low pressure feedwater heaters obtain their steam for heating the feedwater from the extraction steam supply of the low pressure turbines. The heaters 11A, 11B, and 11C are built integrally with the condenser CNDSR; and there are no isolation valves in the extraction steam lines to these feedwater heaters. Each of the remaining low pressure feedwater heaters has an isolation valve in its extraction steam line which are operated from the control console in the central control office (see FIG. 93J).

The second stage of low pressure feedwater heaters 12A, B, and C can each be isolated by the closing of the valves FWCV39, FWCV40, and FWCV41, respectively. The third stage of feedwater heaters 13A, 13B and 13C each can be isolated by closing the valves FWCV36, FWCV37, and FWCV38. Similarly, each of the feedwater heaters in the fourth stage 14A, 14B, and 14C are isolated by closing the extraction steam valves FWCV33, FWCV34, and FWCV35, respectively. Subsequent to the low pressure heaters in each of the three strings there is a high pressure feedwater heater 15A, 15B, and 15C, respectively. The exhaust steam from the high pressure turbine provides the heat for this stage of feedwater heating; and the steam is controlled from the control console through a single valve FWCV32 to all three of these feedwater heaters. The final stage of feedwater heating includes three parallel connected feedwater heaters 16A, 16B, and 16C which receive their steam from the high pressure turbine exhaust through a single remotely controlled isolation valve FWCV31.

Referring to FIG. 105/8, the feedwater heater train is simulated by consolidating the fifteen distinct feedwater heaters into three groups. The feedwater heater group 1 includes the low pressure feedwater heaters 11A through 14A, 11B through 14B, and 11C through 14C. Group 2 includes feedwater heaters 15A, 15B, and 15C. Group 3 feedwater heaters include the high pressure feedwater heaters 16A, 16B, and 16C.

The effect of the three drain coolers 15AD, 15BD and 15CD on the thermodynamic system are calculated by an energy balance utilizing the flow REHW5 from the reheater moisture separator which is summed with the flow FWWH23 into the heater drain tank from the shell side of the feedwater heater group number two and the total flow HDWT from the equivalent heater drain pump HDP described in connection with the fluid system FWFLUD.

The inputs to the thermodynamic feedwater heater simulation in model T46 include the output water from the simulation of the fluid system FWFLUD and the output steam flows from the main steam network simulation. The outputs of this simulation are the steam pressures used in the main steam network calculation and the water and steam enthalpies utilized for the energy balance equation of the steam generator simulation STMGEN.

Referring to the feedwater heater group 1 of FIG. 105/8, the calculations are accomplished by considering the twelve individual feedwater heaters in group 1 as a single "black box". In this simulation it is assumed that all the steam in the group is condensed. Therefore, the flow FWWH13 is equal to the flow LPW2. All flows and masses are scaled in millions of pound per hour. The total heat Q brought to each of the feedwater heaters in group 1 is equal to the difference between the enthalpy of the low pressure extraction steam LPWH2 and the enthalpy FWHH13 of the steam discharge of the feedwater heater group 1 multiplied by the extraction steam flow LPW2. The change in the outlet enthalpy FWHH13 is given by a differential equation as follows:

$$M \frac{d}{dt} FWHH12 = Q + FWWH12 * (FWHH12 - LPH2)$$

where M is the mass of water in the feedwater heater tubes. Also, the flow into the feedwater heater group 1 is equal to the flow out of the feedwater heater group 1 as noted by the identical symbol FWHH12.

From the data supplied with the actual system that is being simulated, the condensing enthalpy can be expressed as a function of the feedwater outlet enthalpy; and for each feedwater heater in the group the condensing enthalpy can be considered as a constant terminal temperature difference. For group 1 however, the condensing enthalpy has a functional dependence on the flow. Therefore, the condensing enthalpy is considered separately for each group in the feedwater heater train.

The differential equation set forth above is written in finite difference form as follows:

$$FWHH12(N+1) = \frac{FWHH12 + \frac{\Delta T}{m}[Q(N)+FWWH12(N)*FWHH12(N)]}{1+\frac{T}{m}FWHH12(N)}$$

where:
ΔT is the integration step size; and the mass of water m is held constant so that the term ΔT/m is expressed as a single variable.

The enthalpy of the condensed steam for the feedwater heater group 1 is a constant, and the condensing pressure is equal to the condenser pressure. The enthalpy HDHTK1 to the heater drain tank HDTK from the drain coolers 15AD, 15BD, and 15CD, is approximated as a mixing of the flows with corresponding enthalpies. Thus, $$HDHTKI = \frac{REW5 * REH5 + FWHH23*FWHH23}{REW5 + FWHH23}$$

The mixing equation at the inlet of feedwater heater group 2 is obtained on the assumption that the drain tank HDTK supplies a constant heat equivalent to the enthalpy rise in the heaters of group 2 of 23.15 Btu's per pound or more specifically in accordance with the following:

$$FWHH22 = \frac{FWWH12 * (FWHH14 + 23.15) + HDWT * HDHTKI}{FWHH12 + HDWT}$$

The feedwater heater group 2 calculations are similar to the calculations described in connection with feedwater heater group 1; and it is assumed that the heat brought by the drain of the feedwater heater group 3 is negligible in comparison to the total heat brought to each heater in the group. The condensing enthalpy for the feedwater heater group 2 is obtained from data on the characteristics of the system so that a constant of 5.10, for example, is added to the group 2 feedwater heater discharge enthalpy FWHH24 to obtain the feedwater heater group 2 steam discharge enthalpy FWHH23. The condensing pressure is obtained from the steam table subroutine PRHSAT, which provides a spline function fit to the saturation pressure versus enthalpy.

Referring to FIG. 105/8, the feedwater heater group 1 and group 2 are bypassed by a line that includes the valve FWCV78. To accommodate flow changes in accordance with the position of this valve, a mixing equation is used to obtain the enthalpy FWHSUC at the feed pump suction as follows:

$$FWHSUC = \frac{FWWH22*FWHH24+FWWH1B+CDHW}{FWWH22+FWWH1B}$$

With reference to the feedwater heater group 3, the calculation is like that for feedwater heater groups 1 and 2 except that the heat transferred in the group 3 feedwater heaters FWQH3 is calculated by taking into account the two heating flows HPW2 and MSWSRH coming into group 3 as follows:

$$FWZH3 = HPW2 * (HPH2-FWHH23)$$
$$+ MSWSRH * (REH3-FWHH33)$$

Also, the feed pumps FWP supply heat to the flow, and it is assumed that the enthalpy FWHH34 is increased by approximately 3 Btu's per pound for example. In the case of the feedwater heater group 3, the condensing enthalpy is found to be a linear function of the per unit flow and is obtained from the following relationship:

$$FWHH33 = 234.4 + 110. * H3TEMP$$

where:

$$H3TEMP = \frac{HPW2+MSWSRH}{1.98154}$$

Further, the internal enthalpy FWHH3 of the steam in feedwater heater group 3 is obtained from the outlet enthalpy FWHH34 and the linear function fit utilizing the same per unit flow as follows:

$$FWHH3 = FWHH34 - (1.2+4.5*H3TEMP)$$

The steam table subroutine PRHSAT provides the pressure for group 3 similar to the pressures for groups 1 and 2.

The steam generator feedwater inlet enthalpy FWHSG is obtained from the mixing equation of the flow through the group 3 feedwater heaters and the bypass around the feedwater heater group 3 controlled by the valve FWC15. In the event there is no feedwater flow, the simulation assumes that the enthalpy is at its minimal value, that is the value of the condenser enthalpy CDHW.

CURVE FITS AND OPTIMUM NODAL POINTS

Steam table routines implement the use of steam and water properties in the simulator. In general, two concepts are used to obtain steam table routines from the steam tables, piecewise linear and piecewise cubic polynomials or "spline" functions.

The two routines ALUE and VALUE for piecewise linear fit use the values of saturation pressure, temperature, enthalpy of water and steam, specific volume of water and steam at six points and, by linear interpolation, obtain functional values at all other points. These routines are flexible because any particular combination of water or steam properties can be used.

The following routines, which are effective for nonlinear networks over a wide range of operations are used in practically all of the models both in the primary and secondary systems and provide the spline function fit.

PRSAT - saturation pressure vs temperature
SVWSAT - saturation specific volume of water vs temperature
SVSSAT - saturation specific volume of steam vs temperature
HWATER - saturation enthalpy of water vs temperature TWATER - saturation temperature vs enthalpy of water
PRHSAT - saturation pressure vs enthalpy of water
TPWATR - saturation temperature vs pressure
HWPSAT - saturation enthalpy of water vs pressure
HSPSAT - saturation enthalpy of steam vs pressure
PVSSAT - saturation pressure vs specific volume of steam
THSTLO - saturation temperature vs enthalpy of steam, at low pressure
HHSTLO - saturation enthalpy of water vs enthalpy of steam, at low pressure
PRHSTLO - saturation pressure vs enthalpy of steam at low pressure.

Each of the above routines are written as a separate subroutine, each containing its own data in the form of the following spline function:

$$S = YY(I) + [Z-X(I)] * \{CONST1(I) - [X(I+1)-Z]*$$
$$[Z \cdot CONSTA(I) + CONSTB(I)]\}$$

where: X(I) are the nodes of the spline function, YY(I) are the functional values at the nodes, and Z is the independent variable for which interpolation is sought. The constants CONST1(I), CONSTA(I), and CONSTB(I) are defined as follows:

$$CONST1(I) = \frac{YY(I+1)-YY(I)}{X(I+1)-X(I)}$$

$$CONSTA(I) = \frac{YYDX(I+1)-YYDX(I)}{6 * [X(I+1)-X(I)]}$$

$$CONSTB(I) = \frac{[2*X(I+1)-X(I)]*YYDX(I)+[X(I+1)-2.*X(I)]*YYDX(I+1)}{6*[X(I+1)-X(I)]}$$

where:
YYDX(I) is the second derivative of the function at the node.

Figure 3:
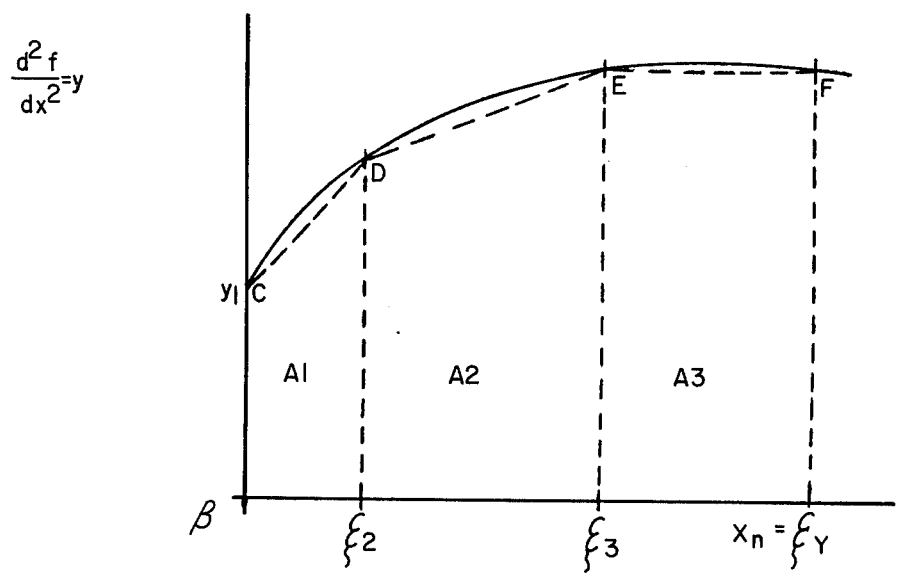
FIG. 3 is a graphical illustration of a cubic spline showing typical nodal points of a non-linear curve.

However, the occurring of a spline fit depends on the position of the nodal points throughout the nonlinear curve. A cubic spline possesses a continuous second derivative which is piecewise linear. Thus, the movement of one node $Y_2$ or $Y_3$ as shown in FIG. 3. changes the shape and areas of polygonal regions $A_1$, and $A_2$ or $A_2$ and $A_3$ respectively and the second derivates thereof. By an optimization of the areas $A_1$, $A_2$, and $A_3$ under the second derivative curve $Y_1 \ldots Y_x$, a set of nodal points $Y_2$ or $Y_3$ are obtained which are the nodes of the best cubic spline approximation.

In the subroutine NODSRC the fact that the second derivative of a cubic spline is a straight line, is utilized. Thus, the problem of approximation to the given function by a cubic spline is translated into a problem of approximating the second derivative of the given function by a first order spline or piecewise linear function. This method provides simplicity, rapid convergence and expandability to any number of nodes for an approximated curve that has a certain degree of smoothness, which is the case in the physical properties of steam and water at saturation.

Mathematically, the problem is as follows: Given a function $f(x)$ defined on a discrete set of points $X = [x_1 < x_2 < \ldots, < x_n]$. Let $s(x)$ be a cubic spline approximation to $f(x)$ with $k$ nodes $Y = [x_1 = y_1 < y_2 < \ldots < y_k = x_n] \subset X$ and $k \ll n$. Determine the nodes $y_2, \ldots y_{k-1}$ and hence $s(x)$ such that the area A under the second derivative of $s(x)$ is optimized.

$$A = \frac{1}{2} \sum_{i=1}^{K-1} (Y_{i+1}-Y_i)[S''(Y_{i+1})-S''(Y_i)]$$

Assuming from the diagram herein that four nodes $k$ are given, with two of them $X_1 = \xi_1$, $X_n = \xi_4$ are fixed end points and two of them are free nodes for which optimal position is desired so that the area of polygon BCDEFGB is closest to the area under the curve $y=f'\lambda'(x)$. The two free nodes $\xi_2$ and $\xi_3$, can take any position determined by the entered data points $x_2, x_3, \ldots, x_{n-1}$ (namely, $\xi_2$ can be equal to $x_2, x_3, \ldots, x_{n-2}$). They, however, cannot coalesce as well as they cannot take the end positions $x_1$ and $x_n$. These restrictions are imposed strictly to facilitate implementation; theoretically, they can take any position between $x_1$ and $x_n$.

If a certain degree of smoothness is assumed, it is possible to obtain a second derivative of $f(x)$ with respect to $x$. One of the available numerical differentiation schemes can be used and the curve $y = d^2f(x)/dx^2$ is obtained. With $\Phi$ being the area of a trapezoid.

$$\Phi = \int_{\xi_1}^{\xi_k} [f''(x) - s''(x)]dx$$

or in the expanded form $$\Phi = \sum_{i=1}^{k-1} \int_{\xi_i}^{\xi_{i+1}} \left[f(x) - \frac{y_{i+1}-y_i}{\xi_{i+1}-\xi_i} x - \frac{y\xi_{i+1}-y_{i+1}\xi_i}{\xi_{i+1}-\xi_i}\right] dx$$

$$= \int_{x_1}^{x_n} f(x)dx - \sum_{i=1}^{k-1} \int_{\xi_i}^{\xi_{i+1}} \frac{(y_{i+1}-y_i)x + y_i\xi_{i+1}-y_{i+1}\xi_i}{\xi_{i+1}-\xi_i} dx$$

To optimize $\Phi$ we have to optimize the sum of the integrals on the righthand side of (1) because $$\int_{x_1}^{xn} f(x)dx$$

is a constant.
Therefore:

$$\min \Phi = \max \sum_{i=1}^{k-1} \int_{\xi_i}^{\xi_{i+1}} \frac{(y_{i+1}-y_i)x+y_i\xi_{i+1}-y_{i+1}\xi_i}{\xi_{i+1}-\xi_i} dx$$

Now because $$\int_{\xi_i}^{\xi_{i+1}} \frac{(y_{i+1}-y_i)x+y_i\xi_{i+1}-y_{i+1}\xi_i}{\xi_{i+1}-\xi_i} dx = \frac{1}{2}(\xi_{i+1}-\xi_i)(y_{i+1}+y_i) = A_i$$

we can write $$\min \Phi = \frac{1}{2} \max \left[ \sum_{i=1}^{k-1} (\xi_{i+1} - \xi_i)(y_{i+1} + y_i) \right] = \max \sum_{i=1}^{k-1} A_i$$

From elementary calculus $$\frac{\gamma A}{\gamma \xi_i} = 0 \quad \text{for } i = 2, 3, \ldots, K-1$$

where $A = \Sigma_i A_i$

Now $$\frac{\gamma A}{\gamma \xi_i} = \frac{1}{2}[(\xi_{i+1} - \xi_i)y'_i - (y_{i+1} - y_{i-1})] = 0$$

or $$Y_i' = \frac{Y_{i+1} - Y_{i-1}}{\xi_{i+1} - \xi_{i-1}}$$

Equation (5) represents a set of k-2 first order non-linear differential equations to be solved simultaneously using a finite difference approximation to the second derivative terms. From this equation it is determined that only two adjacent areas depend on any free node position, which facilitates implementation on a digital computer. The subroutine NODSRC comprises subtractions and divisions to form finite difference approximation to $y_i' \ldots y_i'$ is then integrated and new value of $y_i$ is obtained. Because $(\xi_i, y_i)$ are given in pairs, for every $\xi_i$ there is one and only one $y_i$ (by spline function definition).

In accordance with the above diagram, points D and E move along the curve y until the area of the polygon, consisting of areas $A_1$, $A_2$ and $A_3$, is maximum. Also, movement of the point D influences only areas $A_1$ and $A_2$ while point E influences areas $A_2$ and $A_3$. Thus, if $\xi_2$ and $\xi_3$ are specified as (free nodes) while $\xi_1$ and $\xi_4$ are given as the end points. The position of $\xi_2$ and $\xi_3$ initially is arbitrary in general, they can be chosen equally spaced, but if curve behavior is known, they can be chosen on maxima, minima or inflection points. The cycle starts by forming $y_2'$ and $y_3'$ from these initial guesses and then integrating to obtain new values of $y_2$ and $y_3$. After $y_2$ and $y_3$ are obtained, their corresponding $\xi_2$ and $\xi_3$ are obtained from the data entered. Now the program is ready for new cycle, where $\xi_2$ and $\xi_3$ represent a new and better guess. The solution is found when no further maximation of the area is possible.

It is quite feasible that by choosing different initial guesses one will obtain a different result. This is due to the fact that the points used in the algorithm are discrete and the choice is limited to only given data points. Moreover, in the case of larger number of nodes (around ten or more) the possibility of local extrema arises which again makes convergence more difficult. Evidently, a larger number of data points will make better and more accurate approximation.

When the free nodes are optimally chosen for the piecewise linear approximation, they are taken to be the nodes of the cubic spline approximation to $f(x)$, and the following formula can be used.

$$S(X) = f(X_i) + (X - X_i) * \left\{ \overbrace{\frac{f(X_{i+1}) - f(X_i)}{X_{i+1} - X_i}}^{\text{CONST1}} - (X_{i+1} - X) * \left[ X * \overbrace{\frac{f'(X_{i+1}) - f'(X_i)}{b*(X_{i+1} - X_i)}}^{\text{CONST}A} + \overbrace{\frac{(2*X_{i+1} - X_i)*f'(X_i) + (X_{i+1} - 2*X_i)*f'(X_{i+1})}{b*(X_{i+1} - X_i)}}^{\text{CONST}B} \right] \right\}$$

The program SPLINE SEARCH, which may be an offline program includes three subroutines NODSRC, SPLIN3, and DGT3. As previously mentioned, in the subroutine NODSRC, optimal position of nodes is determined, SPLIN3 calculates coefficients for the cubic spline fit as well as tests obtained fits. For this purpose, pointwise error and percentage errors, and mean square errors are calculated. The subroutine DGT3 is a standard routine and calculates the first derivative of the discretely given function by using LaGrange polynomials. Thus, using DGT3 twice, the second derivative in subroutine NODSRC is provided.

One example, of the method for obtaining optimal nodal value was used for a physical curve where, the curve is only known by data taken from steam tables, is that of specific volume of water vs temperature of saturation. In obtaining optimum nodal points, the number of free nodes selected were 5 (K=7). Several initial guesses were used. The best answer was obtained in 8 iterations with the maximal pointwise error of 1.25% and RMS error of 0.00425 giving positions of nodes at 9th, 19th, 34th, 42nd and 46th place out of 49 data points. The computer printout is included showing initial guess for every iteration, progress of calculation and area obtained (note, area is being minimized here). Furthermore, optimal node position is printed together with piecewise linear approximation and corresponding error. At last coefficients for the cubic spline fit (as given in subroutine SPLIN3,) are printed together with the spline test and corresponding errors.

These coefficients, obtained in the off-line program SPLINE SEARCH, can be used together with the nodes for the on-line calculation in the function routine. A slightly modified version of the subroutine SPLIN3 can be used for this purpose, where nodes and constants are entered as data.

Although, the example given here, i.e., generation of steam and water properties, is a preferred application, the method finds use in a large number of cases requiring function generation over a wide range of the variables where good accuracy and continuity of certain derivatives are needed. It is especially useful where the function curve is specified only in terms of a limited number of points and where no large amount of digital computer time is available for function generation.

Listings of the SPLINE SEARCH program are included in the appendix beginning at page A207 of the U.S. Pat. application Ser. No. 333,901 incorporated herein by reference. Also included is the listing of the function routine SVWSAT which is based on the data obtained from the SPLINE SEARCH program of the example described.

It is understood that the various inventive features in the improved method and simulation system, may be implemented in either an analog, digital, or analog/digital with or without single or multiple computer apparatus. Also many of the features are applicable in the simulation of other pressurized water reactor plant arrangements, boiling water reactor plants, and gas and other nuclear plant arrangements. Also some features are applicable to fossil-fired power plants. It is further understood, that with respect to the individual models, that the changing of one or more models in the simulator does not affect the system, method, or operation of other models in the simulator.

Reference is made to U.S. Pat. application bearing Ser. No. 333,901 entitled "Training Simulator For A Nuclear Power Plant" and filed by G. L. Gregg, R. E. Putman and J. W. Gomola which is assigned to the present assignee and filed concurrently herewith; and which is incorporated herein by reference and made a part hereof.

I claim:

1. An automated training simulator for the real-time dynamic operation of a steam generating plant that includes a plurality of interconnected heat exchangers for increasing the temperature of a fluid by using steam from a predetermined source; said simulator comprising
   a plurality of manually operable command devices each corresponding to a distinct plant control device;
   calculating means including sequence controlling means having the following components; (a) means governed by the manually operable devices to generate a single data value relating to physical values for the representative plurality of interconnected heat exchangers,
   b. means governed by the single generated data value to generate an output data value relating to each of the representative plurality of heat exchangers; and
   indicating means responsive to the output data values to monitor the operation of the representative plurality of heat exchangers.

2. An automated training simulator according to claim 1 wherein the calculating means is structured in a programmed digital computer means.

3. An automated training simulator for the real-time dynamic operation of a steam generating plant that includes a heat exchanger for increasing the temperature of a fluid by using steam from a predetermined source; said simulator comprising
   a plurality of command devices corresponding to plant control devices to generate input signals;
   calculating means including sequence controlling means having the following components; (a) means governed by the input signals to generate a first data value relating to heat exchanger fluid outlet enthalpy in accordance with an instantaneous energy balance,
   b. means to generate a second data value relating to heat exchanger condensed steam enthalpy in accordance with the first generated data value,
   c. means to generate a third data value relating to heat exchanger steam pressure in accordance with the second generated data value; and
   indicating devices governed by the generated third data value to monitor steam pressure of the representative plant.

4. An automated training simulator according to claim 3 wherein the third data value is generated as a cubic spline function of the second generated data value in accordance with the formula $$S = YY(I) + [Z-X(I) * CONST1(I) - [X(I+1)-Z]* [Z°CONSTA(I) + CONSTB(I)]$$

where:
S is the third data value
X(I) are the nodes of the spline function,
YY(I) are the functional values at the nodes,
Z is the second data value, CONST1($I$) is equal to $\frac{YY(I+1)-YY(I)}{X(I+1)-X(I)}$ CONSTA($I$) is equal to $\frac{YYDX(I+1)-YYDX(I)}{6 * [X(I+1)-X(I)]}$ CONSTB($I$) is equal to $$\frac{[2*X(I+1)-X(I)]*YYDX(I)+[X(I+1)-2.*X(I)]*YYDX(I+1)}{6*[X(I+1)-X(I)]}$$

YYDX(I) is the second derivative of the function at the node.

5. An automated training simulator according to claim 4 wherein the data values are generated in a programmed digital computer means.

6. An automated training simulator according to claim 3 wherein the calculating means is structured in a programmed digital computer means.

7. An automated training simulator for the real-time dynamic operation of a steam generating plant that includes a feedwater system for increasing the temperature of water between a condenser and steam generator means and has a plurality of feedwater heaters for heating the water by steam obtained from a predetermined source, said simulator comprising,
   a plurality of command devices to generate input signals corresponding to the operation of representative fluid control devices for steam and feedwater;
   calculating means including sequence controlling means having the following components; (a) means to generate data values relating to flow and enthalpy of feedwater heater inlet steam, data values relating to inlet feedwater, flow and enthalpy, data values relating to condensed feedwater heater steam enthalpy,
   b. means to generate a data value relating to feedwater heater inlet energy in accordance with the generated data value relating to condensed steam enthalpy and the data value relating to feedwater heater inlet steam flow,
   c. means to generate a data value relating to outlet feedwater enthalpy in accordance with the generated data values relating to inlet feedwater flow and enthalpy, and the data value relating to feedwater heater inlet energy,
   d. means to generate a data value relating to steam unit flow of in accordance with data values relating to feedwater heater inlet steam flow and feedwater heater inlet maximum steam flow,
   means to generate a data value relating to condensed steam enthalpy of the condensed steam in accordance with the data values relating to outlet feedwater heater enthalpy and unit flow,
   f. means to generate a data value relating to feedwater heater inlet steam pressure in accordance with the data value relating to condensed steam enthalpy; and
   indicating means governed by predetermined generated data values to monitor the operation of the representative plant.

8. An automated training simulator according to claim 7 wherein the data value relating to inlet energy is generated in accordance with $(H_1-H_2)W_s$ wherein $H_1$ is the enthalpy of steam at the inlet and $H_2$ is the enthalpy of condensed steam at the outlet and $W_s$ is the flow of steam for the representative feedwater heaters.

9. An automated training simulator according to claim 8 wherein the data values are generated in a programmed digital computer means.

10. An automated training simulator according to claim 7 wherein the data value relating to feedwater outlet enthalpy is generated repetitively at successive time intervals in accordance with $$\frac{W + \frac{\text{time step}}{\text{MASS}}(\text{inlet energy} + WH)}{1 + \frac{\text{time step}}{\text{MASS}}W}$$

wherein W is the feedwater flow, time step is a time interval, and H is the feedwater enthalpy, and MASS is a constant.

11. An automated training simulator according to claim 10 wherein the data values are generated for each of a first, second, and third plurality of representative feedwater heaters; the inlet energy data value relating to the second plurality is generated in accordance with the outlet enthalpy data value relating to the third plurality; the inlet energy data value relating to the first plurality is generated in accordance with the outlet enthalpy data value relating to the second plurality; said representative pluralities being a first plurality of representative high pressure parallel connected feedwater heaters, a second plurality of representative intermediate pressure parallel connected feedwater heaters, and a third plurality of representative series-parallel connected low pressure feedwater heaters.

12. An automated training simulator according to claim 11 wherein the data values are generated in a programmed digital computer means.

13. An automated training simulator according to claim 10 wherein the data values are generated in a programmed digital computer means.

14. An automated training simulator according to claim 7 wherein the data value relating to condensed steam enthalpy is generated in accordance with:

OUTLET ENTHALPY - [ K + $K_1$ (unit flow) ]

wherein K, and $K_1$ are constants for a curve fit function.

15. An automated training simulator according to claim 14 wherein the data values are generated in a programmed digital computer means.

16. An automated training simulator according to claim 7 wherein the data value relating to pressure is generated in accordance with data values representing a spline function fit of the data value relating to condensed steam enthalpy; the pressure operating range is represented by a plurality of constant data values relating to node points between each of a plurality of contiguous segments corresponding to the operating pressure range, and the spline function fit is generated in accordance with the constant data values.

17. An automated training simulator according to claim 16 wherein the data values are generated in a programmed digital computer means.

18. An automated training simulator according to claim 7 wherein the data values are generated to represent a first plurality of parallel connected feedwater heaters, and the data values are generated to represent a second plurality of parallel connected feedwater heaters connected in series to the first plurality, and the inlet enthalpy data value representative of the second plurality is generated in accordance with the outlet enthalpy data value representative of the first plurality.

19. An automated training simulator according to claim 18 wherein the data values are generated in a programmed digital computer means.

20. An automated training simulator according to claim 7 wherein the calculating means is structured in a programmed digital computer means.

* * * * *